United States Patent
Kim

(10) Patent No.: US 12,413,504 B2
(45) Date of Patent: Sep. 9, 2025

(54) METHOD FOR UTILIZING ANALYTICS ON POWER CONSUMPTION INFORMATION

(71) Applicant: LG Electronics Inc., Seoul (KR)

(72) Inventor: Hyunsook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 375 days.

(21) Appl. No.: 18/073,907

(22) Filed: Dec. 2, 2022

(65) Prior Publication Data

US 2023/0412487 A1     Dec. 21, 2023

Related U.S. Application Data

(60) Provisional application No. 63/352,647, filed on Jun. 16, 2022.

(51) Int. Cl.
| | |
|---|---|
| *H04L 45/0377* | (2022.01) |
| *H04W 60/00* | (2009.01) |
| *H04W 76/10* | (2018.01) |

(52) U.S. Cl.
CPC ......... *H04L 45/0377* (2022.05); *H04W 60/00* (2013.01); *H04W 76/10* (2018.02)

(58) Field of Classification Search
CPC ............... H04L 41/0894; H04L 41/142; H04L 41/147; H04L 45/0377; H04L 45/70; H04W 4/40; H04W 40/10; H04W 60/00; H04W 76/10; H04W 88/14
See application file for complete search history.

(56) References Cited

U.S. PATENT DOCUMENTS

| | | | |
|---|---|---|---|
| 10,833,986 B2 * | 11/2020 | Zhuang | ........ H04L 45/74 |
| 11,228,530 B2 | 1/2022 | Shao | |
| 11,477,109 B2 * | 10/2022 | Xu | ........ H04L 45/02 |
| 11,516,130 B2 * | 11/2022 | Zhuang | ........ H04L 45/74 |
| 11,627,067 B2 * | 4/2023 | Xu | ........ H04L 45/0377 370/392 |
| 12,143,271 B2 * | 11/2024 | de Oliveira | ........ H04L 41/40 |
| 2009/0010189 A1 | 1/2009 | Nagra et al. | |

(Continued)

FOREIGN PATENT DOCUMENTS

| | | | | | |
|---|---|---|---|---|---|
| CN | 112511432 A | * | 3/2021 | ........ | H04L 12/4633 |
| CN | 112511432 B | * | 1/2022 | ........ | H04L 12/4633 |

(Continued)

OTHER PUBLICATIONS

3GPP TR 28.813 V2.0.0, "3rd Generation Partnership Project; Technical Specification Group SA; Telecommunication management; Study on new aspects of Energy Efficiency (EE) for 5G (Release 17)," Dec. 2021, 50 pages.

(Continued)

*Primary Examiner* — Eric Nowlin
(74) *Attorney, Agent, or Firm* — Fish & Richardson P.C.

(57) ABSTRACT

A method and apparatus for utilizing analytics on power consumption information. A Network Function (NF) supporting a Service Function Chaining (SFC) receives an N4 rule generated by a Session Management Function (SMF) from the SMF. The N4 rule includes information related to change of an SFC path based on power consumption of a UE. The NF supporting the SFC determines an SFC path based on the information related to the change of the SFC path, and communicates with the UE based on the determined SFC path.

14 Claims, 10 Drawing Sheets

(56) References Cited

U.S. PATENT DOCUMENTS

| | | | |
|---|---|---|---|
| 2018/0176281 A1* | 6/2018 | Arunachalam | H04L 43/0829 |
| 2019/0140947 A1* | 5/2019 | Zhuang | H04L 45/306 |
| 2019/0158997 A1 | 5/2019 | Starsinic et al. | |
| 2019/0190813 A1* | 6/2019 | Xu | H04L 45/64 |
| 2020/0314139 A1* | 10/2020 | Migault | H04L 45/64 |
| 2021/0044525 A1* | 2/2021 | Zhuang | H04L 45/74 |
| 2021/0344586 A1* | 11/2021 | Xu | H04L 45/0377 |
| 2022/0247688 A1* | 8/2022 | Puente Pestaña | H04L 45/0377 |
| 2023/0056442 A1* | 2/2023 | Ly | H04W 24/08 |
| 2023/0058366 A1* | 2/2023 | Perez Martinez | H04L 41/5051 |
| 2023/0135699 A1* | 5/2023 | Liao | H04W 4/50 370/252 |
| 2023/0199560 A1* | 6/2023 | Nuggehalli | H04W 28/0917 455/450 |
| 2023/0275834 A1* | 8/2023 | Huang | H04L 45/76 370/392 |
| 2024/0073094 A1* | 2/2024 | de Oliveira | H04L 67/34 |
| 2024/0187331 A1* | 6/2024 | Ding | H04L 47/78 |
| 2025/0016870 A1* | 1/2025 | Park | H04W 76/20 |

FOREIGN PATENT DOCUMENTS

| | | | | |
|---|---|---|---|---|
| EP | 3420688 B1 | * | 11/2020 | H04L 45/306 |
| JP | 2024516488 A | * | 4/2024 | |
| WO | WO-2018036453 A1 | * | 3/2018 | G02B 6/4201 |
| WO | WO 2021/155090 | | 8/2021 | |
| WO | WO2022006109 | | 1/2022 | |
| WO | WO2022109184 | | 5/2022 | |
| WO | WO-2022235690 A1 | * | 11/2022 | H04L 45/037 |

OTHER PUBLICATIONS

Extended European Search Report in European Appln No. 22209316. 3, dated May 16, 2023, 12 pages.

Moosavi et al., "Energy Efficiency Through Joint Routing and Function Placement in Different Modes of SDN/NFV Networks," CoRR, Submitted on Oct. 18, 2020, arXiv:2007.13230v3, 31 pages.

Office Action in Korean Appln. No. 10-2022-0153037, mailed on Jan. 6, 2025, 8 pages (with English translation).

* cited by examiner

METHOD FOR UTILIZING ANALYTICS ON POWER CONSUMPTION INFORMATION

CROSS-REFERENCE TO RELATED APPLICATIONS

This application claims the benefit of U.S. Provisional Application No. 63/352,647, filed on Jun. 16, 2022, which is hereby incorporated by reference herein in its entirety.

TECHNICAL FIELD

The present disclosure relates to a method for utilizing analytics on power consumption information.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems, 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

In operating a network, various network functions, such as a firewall packet filtering function and a load balancing function, may be used. It is expected that techniques such as virtualization, overlay, and orchestration will be introduced into networks in the future, and these techniques are expected to affect services that provide network functions. An existing network service is a form in which network service functions exist on a data transfer path between a source and a destination host. However, when Network Function Virtualization (NFV) technology is introduced, the network service function may not exist on the data transfer path, but the data traffic may be transmitted via the path where the network service function required by itself exists.

As one of ultimate targets of the 5G evolution and 6G, interest in zero-touch configuration/operation is increasing. 3GPP is continuously conducting research to perform network automation by utilizing the information analysis/prediction function of NWDAF. In particular, as types of traffic models different from conventional service types, such as AI-supported services and XR services, emerge, it may be necessary to provide effective services tailored to the characteristics of each service.

SUMMARY

In an aspect, a method performed by a Network Function (NF) supporting a Service Function Chaining (SFC) adapted to operate in a wireless communication system is provided. The method includes receiving an N4 rule generated by a Session Management Function (SMF) from the SMF. The N4 rule includes information related to change of an SFC path based on power consumption of a UE. The method includes determining an SFC path based on the information related to the change of the SFC path, and communicating with the UE based on the determined SFC path.

In another aspect, an apparatus for implementing the above method is provided.

DETAILED DESCRIPTION

Figure 1:
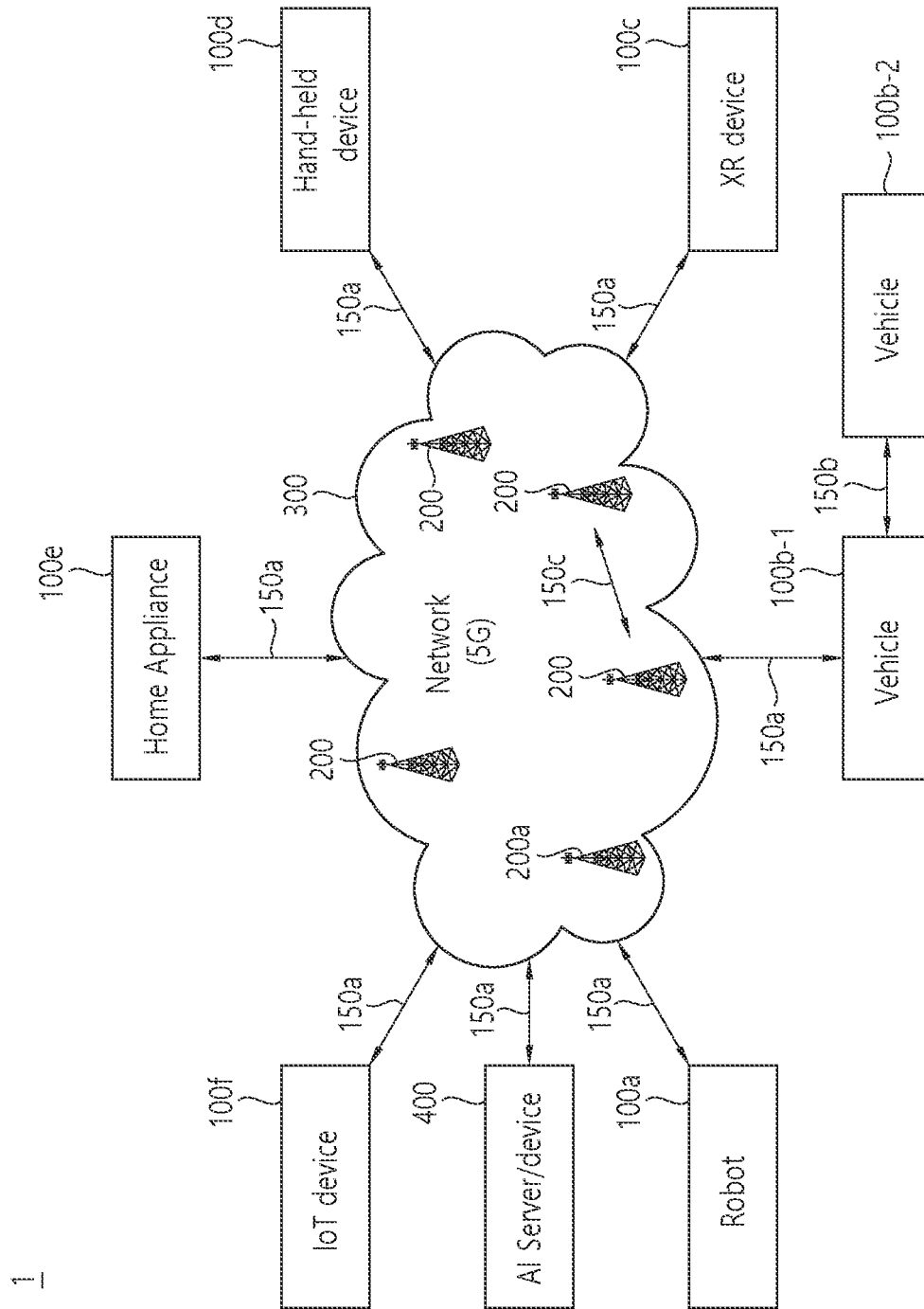
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. Evolution of 3GPP LTE includes LTE-A (advanced), LTE-A Pro, and/or 5G new radio (NR).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure. "at least one of A, B and C" may mean "only A", "only B", "only C", or "any combination of A, B and C". In addition, "at least one of A, B or C" or "at least one of A, B and/or C" may mean "at least one of A. B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example. ZigBee technology may generate personal area networks (PANs) associated with small/low-power digital communication based on various specifications such as IEEE 802.15.4 and may be called various names.

Figure 2:
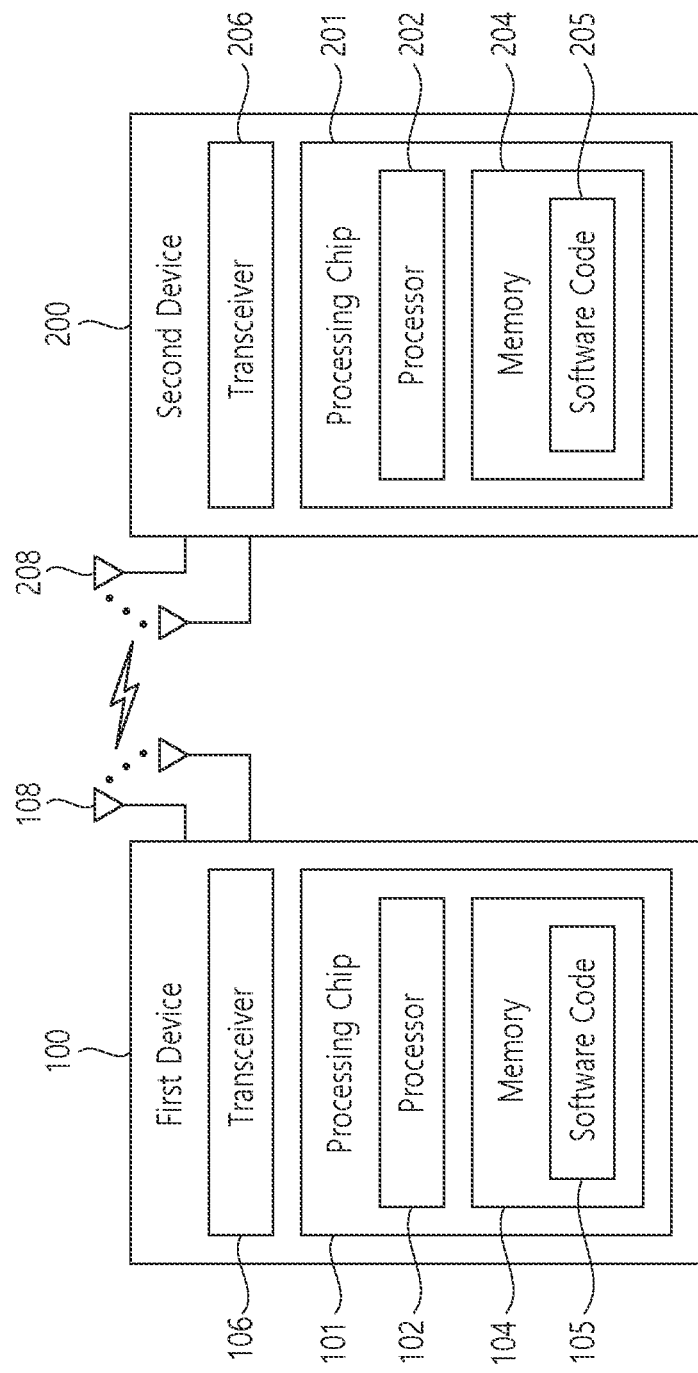
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100a to 100f and the wireless device 100a to 100f and/or (the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be adapted to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be adapted to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs. SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be adapted to include the modules, procedures, or functions. Firmware or software adapted to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be adapted to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be adapted to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be adapted to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
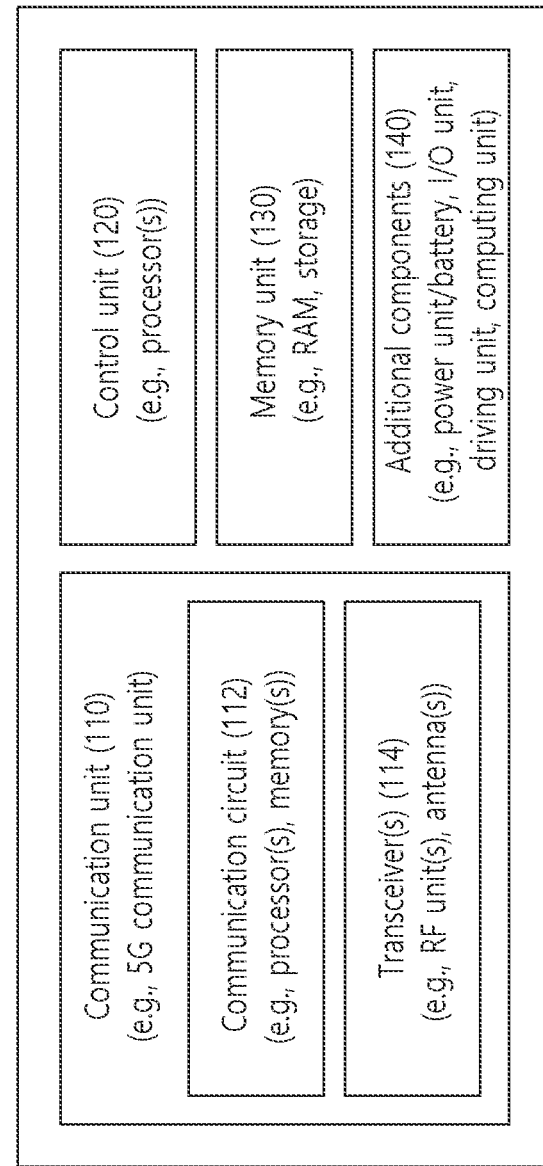
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a DRAM, a ROM, a flash memory, a volatile memory, a non-volatile memory, and/or a combination thereof.

Figure 4:
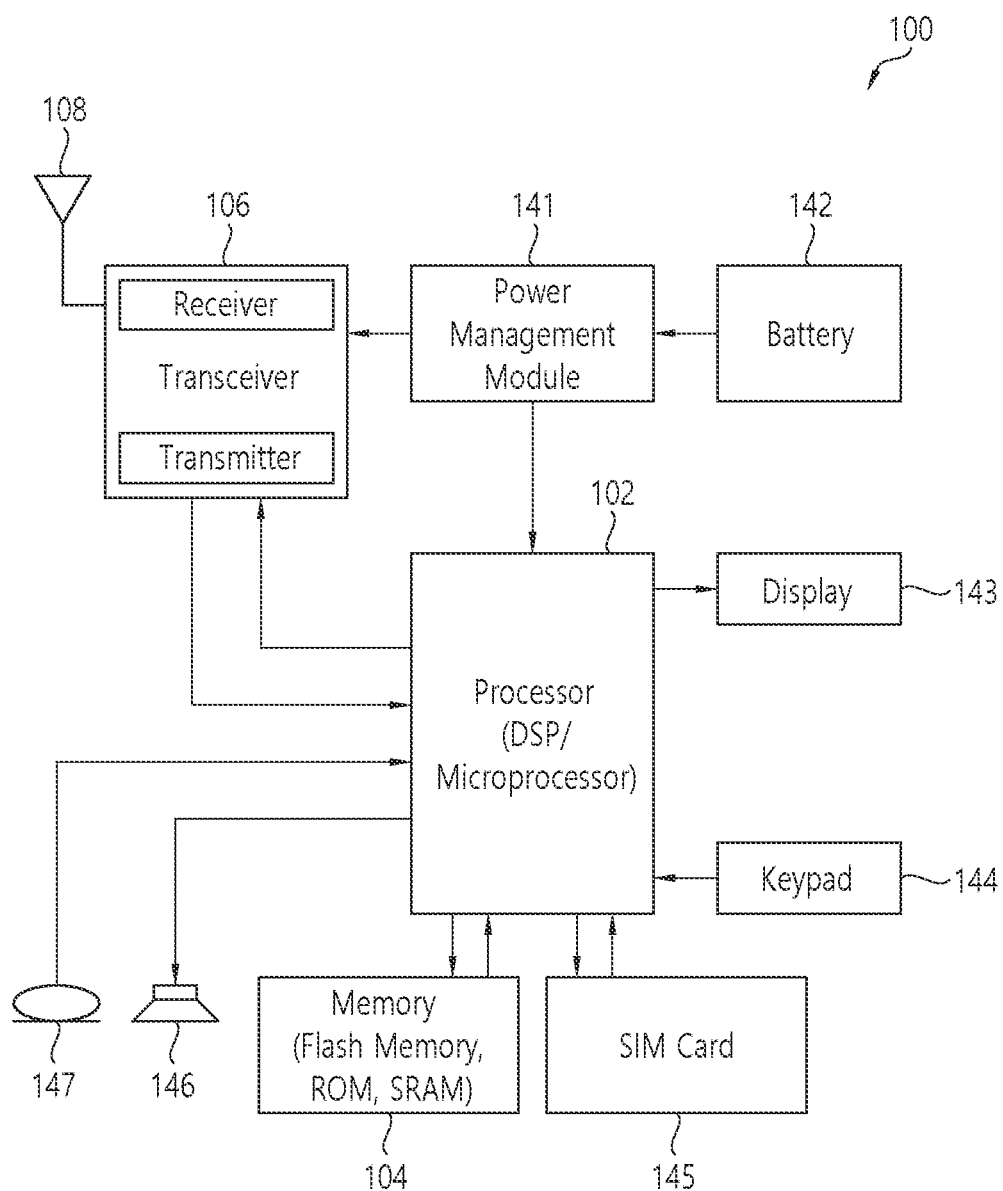
FIG. 4 shows an example of UE to which implementations of the present disclosure is applied.

FIG. 4 shows an example of UE to which implementations of the present disclosure is applied.

Referring to FIG. 4, a UE 100 may correspond to the first wireless device 100 of FIG. 2 and/or the wireless device 100 or 200 of FIG. 3.

A UE 100 includes a processor 102, a memory 104, a transceiver 106, one or more antennas 108, a power management module 110, a battery 112, a display 114, a keypad 116, a subscriber identification module (SIM) card 118, a speaker 120, and a microphone 122.

The processor 102 may be adapted to implement the descriptions, functions, procedures, suggestions, methods and/or operational flowcharts disclosed in the present disclosure. The processor 102 may be adapted to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 116 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 5:
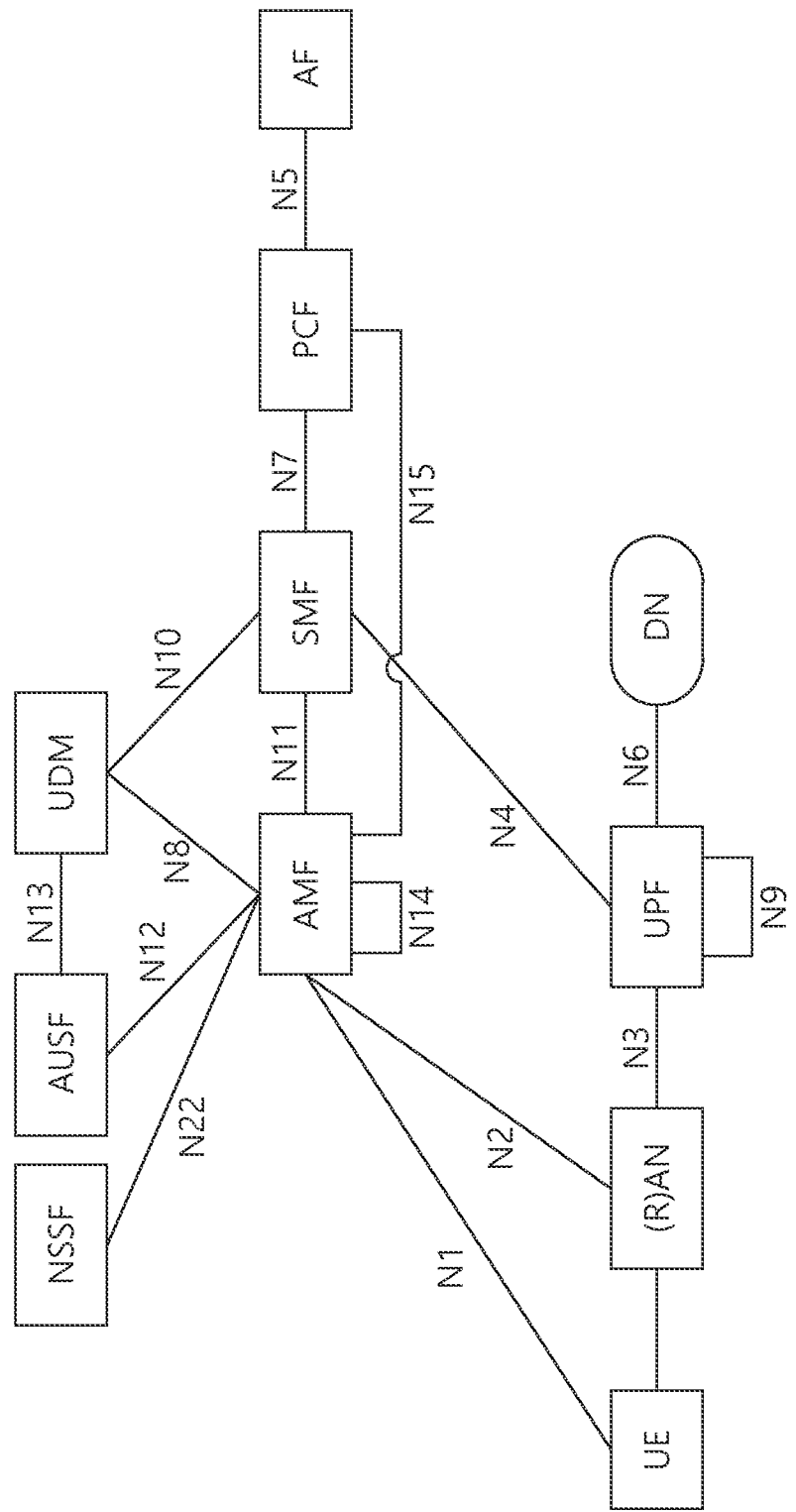
FIG. 5 shows an example of 5G system architecture to which implementations of the present disclosure is applied.

FIG. 5 shows an example of 5G system architecture to which implementations of the present disclosure is applied.

The 5G system (5GS) architecture consists of the following network functions (NF).
 Authentication Server Function (AUSF)
 Access and Mobility Management Function (AMF)
 Data Network (DN), e.g., operator services, Internet access or 3rd party services
 Unstructured Data Storage Function (UDSF)
 Network Exposure Function (NEF)
 Intermediate NEF (I-NEF)
 Network Repository Function (NRF)
 Network Slice Selection Function (NSSF)
 Policy Control Function (PCF)
 Session Management Function (SMF)
 Unified Data Management (UDM)
 Unified Data Repository (UDR)
 User Plane Function (UPF)
 UE radio Capability Management Function (UCMF)
 Application Function (AF)
 User Equipment (UE)
 (Radio) Access Network ((R)AN)
 5G-Equipment Identity Register (5G-EIR)
 Network Data Analytics Function (NWDAF)
 CHarging Function (CHF)

Furthermore, the following network functions may be considered.
 Non-3GPP InterWorking Function (N3IWF)
 Trusted Non-3GPP Gateway Function (TNGF)
 Wireline Access Gateway Function (W-AGF)

FIG. 5 depicts the 5G system architecture in the non-roaming case, using the reference point representation showing how various network functions interact with each other.

In FIG. 5, for the sake of clarity of the point-to-point diagrams, the UDSF, NEF and NRF have not been depicted. However, all depicted Network Functions can interact with the UDSF, UDR, NEF and NRF as necessary.

For clarity, the UDR and its connections with other NFs. e.g., PCF, are not depicted in FIG. 5. For clarity, the NWDAF and its connections with other NFs, e.g., PCF, are not depicted in FIG. 5.

The 5G system architecture contains the following reference points:
 N1: Reference point between the UE and the AMF.
 N2: Reference point between the (R)AN and the AMF.
 N3: Reference point between the (R)AN and the UPF.
 N4: Reference point between the SMF and the UPF.

N6: Reference point between the UPF and a Data Network.

N9: Reference point between two UPFs.

The following reference points show the interactions that exist between the NF services in the NFs.

N5: Reference point between the PCF and an AF.

N7: Reference point between the SMF and the PCF.

N8: Reference point between the UDM and the AME

N10: Reference point between the UDM and the SMF.

N11: Reference point between the AMF and the SMF.

N12: Reference point between the AMF and the AUSF.

N13: Reference point between the UDM and the AUSF.

N14: Reference point between two AMFs.

N15: Reference point between the PCF and the AMF in the case of non-roaming scenario, PCF in the visited network and AMF in the case of roaming scenario.

N16: Reference point between two SMFs, (in roaming case between SMF in the visited network and the SMF in the home network).

N22: Reference point between the AMF and the NSSF.

In some cases, a couple of NFs may need to be associated with each other to serve a UE.

NWDAF is described.

The NWDAF is part of the 5G system architecture exemplarily described in FIG. 5.

The NWDAF interacts with different entities for different purposes.

Data collection based on subscription to events provided by AMF, SMF, PCF, UDM, AF (directly or via NEF), and Operation Administration Maintenance (OAM);

Retrieval of information from data repositories (e.g., UDR via UDM for subscriber-related information);

Retrieval of information about NFs (e.g., from NRF for NF-related information),

On demand provision of analytics to consumers.

A single instance or multiple instances of NWDAF may be deployed in a public land mobile network (PLMN). If multiple NWDAF instances are deployed, the 5G system architecture supports deploying the NWDAF as a central NF, as a collection of distributed NFs, or as a combination of both.

When multiple NWDAFs exist, not all of them need to be able to provide the same type of analytics results, i.e., some of them can be specialized in providing certain types of analytics. An analytics ID information element (TE) is used to identify the type of supported analytics that NWDAF can generate.

NWDAF instance can be collocated with a 5GS NF.

The 5G system architecture allows the NWDAF to collect data from any 5GC NF.

The NWDAF belongs to the same PLMN as the 5GC NF that provides the data.

The Nnf interface is defined for the NWDAF to request subscription to data delivery for a particular context, to cancel subscription to data delivery and to request a specific report of data for a particular context.

The 5G system architecture allows the NWDAF to retrieve the management data from the OAM by invoking OAM services.

In addition, the 5G system architecture allows any 5GC NF to request network analytics information from the NWDAF. The NWDAF belongs to the same PLMN as the 5GC NF that consumes the analytics information.

The Nnwdaf interface is defined for 5GC NFs, to request subscription to network analytics delivery for a particular context, to cancel subscription to network analytics delivery and to request a specific report of network analytics for a particular context.

The NWDAF provides analytics to 5GC NFs, and OAM.

Analytics information are either statistical information of the past events, or predictive information.

Different NWDAF instances may be present in the 5GC, with possible specializations per type of analytics. The capabilities of a NWDAF instance are described in the NWDAF profile stored in the NRF.

In order to support NFs that are consumers of analytics with the discovery of a NWDAF instance that is able to provide some specific type of analytics, each NWDAF instance should provide the list of analytics ID(s) that it supports when registering to the NRF, in addition to other NRF registration elements of the NF profile. Other NFs requiring the discovery of an NWDAF instance that provides support for some specific type of analytics may query the NRF and include the analytics ID(s) that identifies the desired type of analytics for that purpose.

The consumers, i.e., 5GC NFs and OAM, decide how to use the data analytics provided by NWDAF.

The interactions between 5GC NF and the NWDAF take place within a PLMN.

The NWDAF has no knowledge about NF application logic. The NWDAF may use subscription data but only for statistical purpose.

The NWDAF service consumer selects an NWDAF that supports requested analytics information by using the NWDAF discovery principles.

The abstraction of the service functions required for a specific service and the application order between them is called a Service Function Chain (SFC). SFCs may be formed by selecting specific service function instances on specific network nodes to build a service graph called a Service Function Path (SFP). That is, SFC means a technology for routing data packets to a network function to be applied to data packets.

Figure 6:
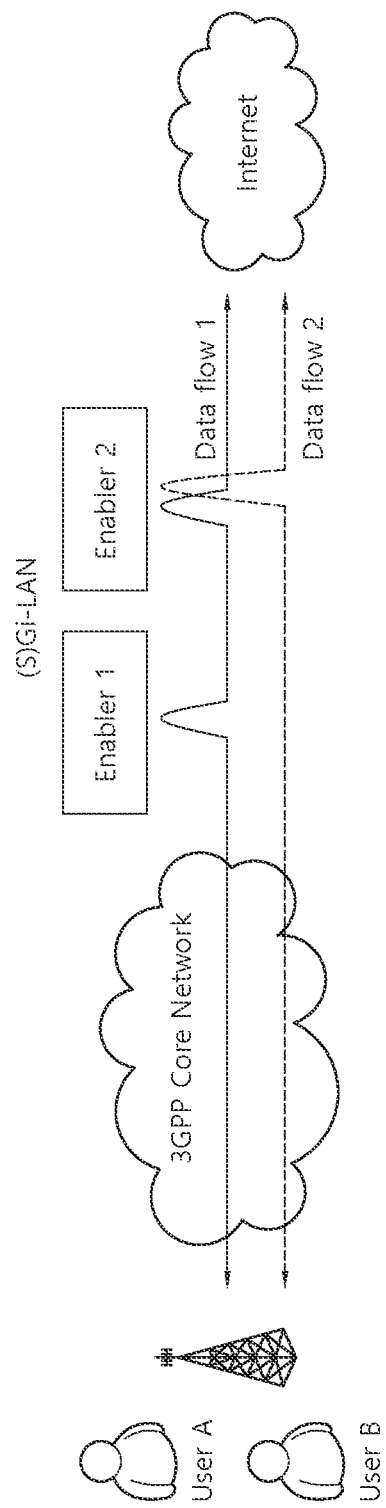
FIG. 6 shows an example of a concept of SFC to which implementations of the present disclosure is applied.

FIG. 6 shows an example of a concept of SFC to which implementations of the present disclosure is applied.

In order to implement efficient and flexible mobile service steering in (S)Gi-LAN, Mobile Network Operator (MNO) may define traffic steering policies by using some information (e.g., user profile, Radio Access Technology (RAT) type, application characteristics, etc.). These policies are used to steer the traffic data of the MNO's subscribers to the appropriate enablers on the (S)Gi-LAN.

Referring to FIG. 6, according to the traffic steering policy, data flow 1 associated with user A is steered to enabler 1 or enabler 2, and data flow 2 associated with user B is steered to enabler 2.

In applying SFC to 5G NR, the following issues may exist.

(1) Traffic Steering Policy and SFC Enhancements

Currently, the SMF may be configured with the traffic steering policy related to the mechanism enabling traffic steering to the N6-LAN, DN and/or DN Access Identifiers (DNAIs) associated with N6 traffic routing requirements provided by the AF. Also, UPF with SFC capabilities need to support flexible SFC configuration for a PDU session that requires different SFC processing for different applications. Accordingly, the following may be discussed.

Whether the existing traffic steering policy is enough to fulfil the requirements or needs to be enhanced for SFC, and if it needs to be enhanced whether SFC policy need to be defined and how it relates to traffic steering policy.

If SFC policy is defined, based on the SFC policy definition, what are the required architecture enhancement for the network functions, interfaces, and the procedures to enforce SFC policies and/or traffic steering policies to identify/detect/classify user plane traffic and steer the traffic flows of the UEs requiring SFC processing for their applications in non-roaming scenarios?

If SFC policy is defined, based on the SFC policy definition:
  i) For cases that UE is at Visited PLMN (VPLMN), UE returns from VPLMN to Home PLMN (HPLMN), or UE changes of serving VPLMN, whether and how the HPLMN can apply traffic steering policies and/or SFC polices for home routed traffic.
  ii) What are the relationship between traffic steering and SFC processing in the user plane.
  iii) What are the new features that the UPF may support in order to allow improved Rel-18 SFC capabilities.
  iv) Whether and how to enhance interfaces and procedures to support UPF with SFC capability including how such capabilities may be available, discovered, and controlled by the SMF.

(2) Exposure to Enable AF to Request Predefined SFC for Traffic Flows Related with Target UE For allowing an AF, e.g., a third party AF, to request predefined SFC for traffic flows, etc. (when the AF belongs to a third party, this is based on service level agreement with the third party), the following may be discussed.

How to enable support for AF to request usage of predefined SFC/SFP(s) for traffic flow(s) related with target UE(s).

Whether and if yes how to enhance network capability exposure functionalities

As one of methods for solving the above discussion, reusing the existing Traffic Steering Policy (TSP) for the N6-LAN may be discussed. This solution is based on the existing Rel-17 solution for steering the subscriber's traffic to appropriate operator or 3rd party service functions (e.g., Network Address Translation (NAT), antimalware, parental control, Distributed Denial of Service (DDoS) protection) in the N6-LAN).

This solution is based on the following key aspects, based on existing standards.

The PCF determines a policy per Service Data Flow (SDF)/application for the purpose of steering the subscriber's traffic to appropriated N6 service functions deployed by the operator or a 3rd party service provider. The policy is expressed in a TSP ID that may be separate in UL and DL directions.

The TSP ID refers to a traffic steering behavior that is configured in the SMF/UPF.

The PCF provides the TSP ID in the Policy and Charging Control (PCC) rules to SMF.

The UPF indicates its capability to support traffic steering in N4 and in UPF profile in NRF. The SMF may take this capability into account when selecting UPF.

The SMF instructs the UPF to perform necessary actions to enforce the traffic steering policy referenced by the PCF. This includes the provisioning of corresponding Packet Detection Rules (PDRs), Forward Action Rules (FARs), QoS Enforcement Rules (QERs) etc. In particular, the SMF creates a FAR with the Forwarding Policy parameters set to the TSP ID.

The UPF performs the necessary actions to enforce the forwarding policy referenced by the SMF, e.g. performing packet marking and routing the traffic towards the service functions within the N6-LAN.

Several parameters and information may be considered by the SMF for UPF selection and re-selection. For example:

Capability of the UPF and the functionality required for the particular UE session: An appropriate UPF may be selected by matching the functionality and features required for a UE.

How the SMF determines information about the user plane network topology and what information is considered by the SMF, is based on operator configuration.

In this particular context, the SMF may be able to select appropriate UPF regards specific TSP based on:

If the UPF indicated that traffic steering is supported by the UP function.

It is assumed that 5GC configuration is homogeneous for providing the same set of traffic steering policies within same DNAI/DNN/S-NSSAI. The SMF may select UPF based on DNAI/DNN/S-NSSAI.

Figure 7:
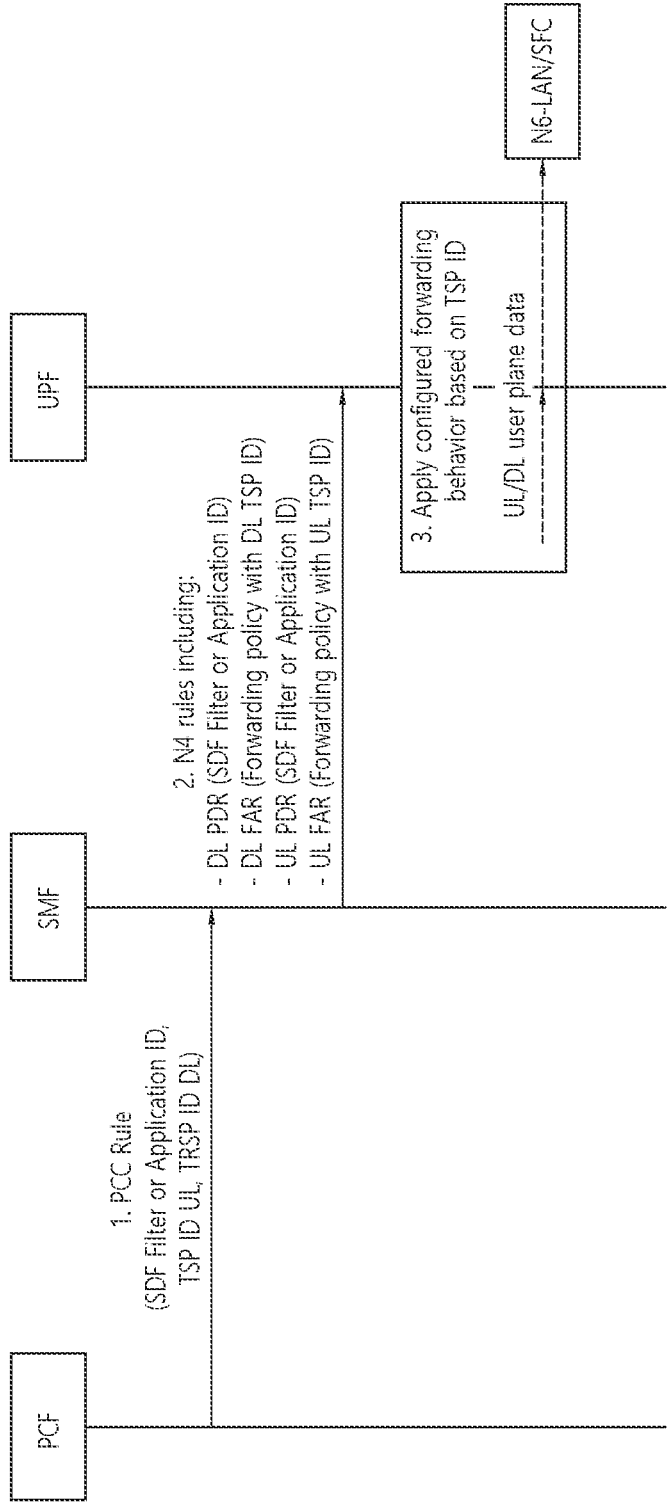
FIG. 7 shows an example of a procedure using a TSP to which implementations of the present disclosure is applied.

FIG. 7 shows an example of a procedure using a TSP to which implementations of the present disclosure is applied.

The procedure of FIG. 7 shows an example with dynamic PCC rules. It is also possible to activate predefined PCC rules with TSP applied by the UPF (not shown in FIG. 7).

Referring to FIG. 7, the following operation is performed.
1. The PCF makes a policy decision and creates a PCC rule with SDF filter information or Application ID, TSP IDs, charging key, etc.
2. The SMF creates N4 rules based on the PCC rule content.
3. The UPF applies the configured forwarding behavior to steer the traffic to the appropriate service chain based on TSP IDs, e.g., encapsulation, packet marking, forwarding.

All UPFs in the operator network serving as PDU Session Anchor (PSA) for the DNN/S-NSSAI/DNAI that is used for traffic that is potentially subject to SFC controls need to be configured with traffic steering information towards all SFPs supported on that DNN/S-NSSAI/DNAI.

Currently, SFC paths are determined based on configurations, and real-time analytic/prediction values based on network automation are not used to determine SFC paths. In particular, no attempt has yet been made to provide a customized service for each service by considering the power consumption of the UE in real time.

Hereinafter, according to implementations of the present disclosure, a method of determining an SFC path using analytic information and prediction information on power consumption will be described.

In the present disclosure described below, certain steps may be performed concurrently and/or in parallel, or may be performed in an inverted order.

According to implementations of the present disclosure, the operation of the first network node is as follows. For example, the first network node may be NWDAF.

The first network node may collect/obtain information related to power consumption of the UE (e.g., information related to the battery level of the UE, etc.). The first network node may collect/obtain information related to power consumption of the UE directly from the UE or indirectly from a base station, an Operation Administration Maintenance (OAM) node, a third network node, AF, etc.

The first network node may analyze statistic values and/or prediction values for efficiency of the SFC path based on the collected/obtained information related to power consumption of the UE. In particular, the first network node may analyze statistic values and/or prediction values for efficiency of the SFC path that is changed depending on whether a specific enabler is used or not based on the collected/obtained information related to power consumption of the UE.

The first network node may transmit the analyzed statistic values and/or prediction values to the network node. The network node to which the first network node transmits the analyzed statistic values and/or prediction values value may include a PCF, SMF, UPF, or NF having an SFC function, which is a network node that affects SFC path determination/change.

According to implementations of the present disclosure, the operation of the second network node is as follows. For example, the second network node may be a PCF or SMF.

The second network node may decide to maintain or change the SFC path using the analyzed statistic values and/or prediction values value obtained from the first network.

The second network node may create policies and/or rules that may maintain or change the SFC path using the analyzed statistic values and/or prediction values obtained from the first network node. If the second network node is a PCF, the policy may be a PCC rule. When the second network node is an SMF, the rule may be an N4 rule.

The second network node may transmit, to network nodes that enforce/apply maintenance or change of the actual SFC path, at least one of information related to maintenance or change of the SFC path, policies and/or rules capable of maintaining or changing the SFC path, or index or indicator information associated with a pre-configured rule. The network nodes that enforce/apply maintenance or change of the actual SFC path may include an SMF or UPF (in this case, via SMF) or an NF having an SFC function (in this case, via SMF and/or UPF).

According to implementations of the present disclosure, the operation of the third network node is as follows. For example, the third network node may be an NF having SFC function. An NF having an SFC function may exist separately from the UPF, or may be located together with the UPF in a form in which the UPF has the SFC function.

The third network node may obtain the analyzed statistic values and/or prediction values directly from the first network node and determine whether to maintain or change the SFC path accordingly.

The third network node may receive, from another network nodes (e.g., PCF, SMF, UPF), at least one of information related to maintenance or change of the SFC path, policies and/or rules capable of maintaining or changing the SFC path, or index or indicator information associated with a pre-configured rule generated based on the analytics provided by the first network node, and determine whether to maintain or change the SFC path accordingly.

The third network node may transmit data by applying the determined SFC path.

Determining the SFC path may include selecting at least one enabler. Selecting at least one enabler may include determining whether to include a particular enabler in the determined SFC path and/or whether to replace one enabler with another enabler. That is, the enabler applied may vary according to the SFC path.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

Figure 8:
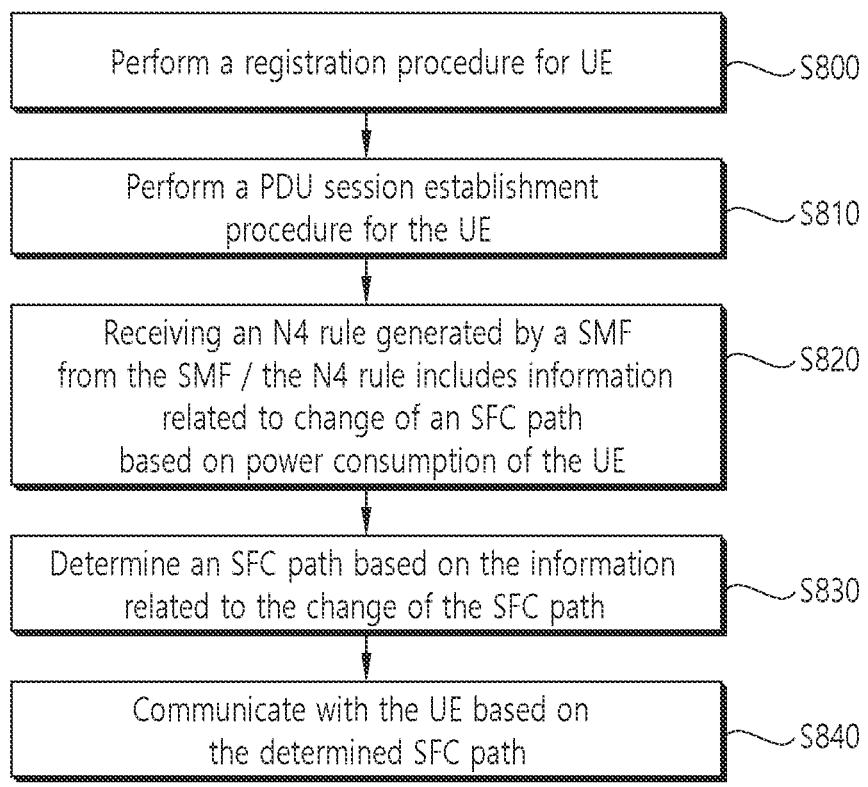
FIG. 8 shows an example of a method performed by an NF supporting an SFC to which implementations of the present disclosure is applied.

FIG. 8 shows an example of a method performed by an NF supporting an SFC to which implementations of the present disclosure is applied.

In some implementations, the NF supporting the SFC may a UPF. Or, the NF supporting the SFC may be a node different from the UPF, and is located together with the UPF or located separately from the UPF.

Referring to FIG. 8, in step S800, the method includes performing a registration procedure for a UE.

In step S810, the method includes performing a PDU session establishment procedure for the UE.

In step S820, the method includes receiving an N4 rule generated by a SMF from the SMF. The N4 rule includes information related to change of an SFC path based on power consumption of the UE.

In some implementations, the information related to the change of the SFC path may be generated by the SMF based on the information about the power consumption of the UE collected and analyzed by an NWDAF.

In some implementations, the information related to the change of the SFC path may be generated by a PCF based on the information about the power consumption of the UE collected and analyzed by a NWDAF. In this case, the PCF may generate a PCC rule including the information related to the change of the SFC path.

In some implementations, the information about the power consumption of the UE may include at least one of a statistic value or a prediction value for efficiency of an SFC path that is changed depending on whether a specific enabler is used.

In some implementations, the information about the power consumption of the UE may include information on a battery level of the UE.

In some implementations, the information related to the change of the SFC path may include at least one of an index or an indicator associated with an SFC path change rule or a pre-configured SFC change rule.

In step S830, the method includes determining an SFC path based on the information related to the change of the SFC path.

In step S830, the method includes communicating with the UE based on the determined SFC path.

In some implementations, the SFC path may be associated with at least one enabler.

In some implementations, the UE may communicate with at least one of a mobile device, a network and/or an autonomous vehicle other than the UE.

Furthermore, the method in perspective of the NF supporting the SFC described above in FIG. 8 may be performed by the second wireless device 200 shown in FIG. 2 and/or the wireless device 200 shown in FIG. 3.

More specifically, the NF supporting the SFC comprises at least one transceiver, at least one processor, and at least one memory operably connectable to the at least one processor and storing instructions. Based on the instructions being executed by the at least one processor, the followings operations are performed.

The NF supporting the SFC performs a registration procedure for a UE.

The NF supporting the SFC performs a PDU session establishment procedure for the UE.

The NF supporting the SFC receives an N4 rule generated by a SMF from the SMF. The N4 rule includes information related to change of an SFC path based on power consumption of the UE.

In some implementations, the information related to the change of the SFC path may be generated by the SMF based on the information about the power consumption of the UE collected and analyzed by an NWDAF.

In some implementations, the information related to the change of the SFC path may be generated by a PCF based on the information about the power consumption of the UE collected and analyzed by a NWDAF. In this case, the PCF may generate a PCC rule including the information related to the change of the SFC path.

In some implementations, the information about the power consumption of the UE may include at least one of a statistic value or a prediction value for efficiency of an SFC path that is changed depending on whether a specific enabler is used.

In some implementations, the information about the power consumption of the UE may include information on a battery level of the UE.

In some implementations, the information related to the change of the SFC path may include at least one of an index or an indicator associated with an SFC path change rule or a pre-configured SFC change rule.

The NF supporting the SFC determines an SFC path based on the information related to the change of the SFC path.

The NF supporting the SFC communicate with the UE based on the determined SFC path.

In some implementations, the SFC path may be associated with at least one enabler.

Figure 9:
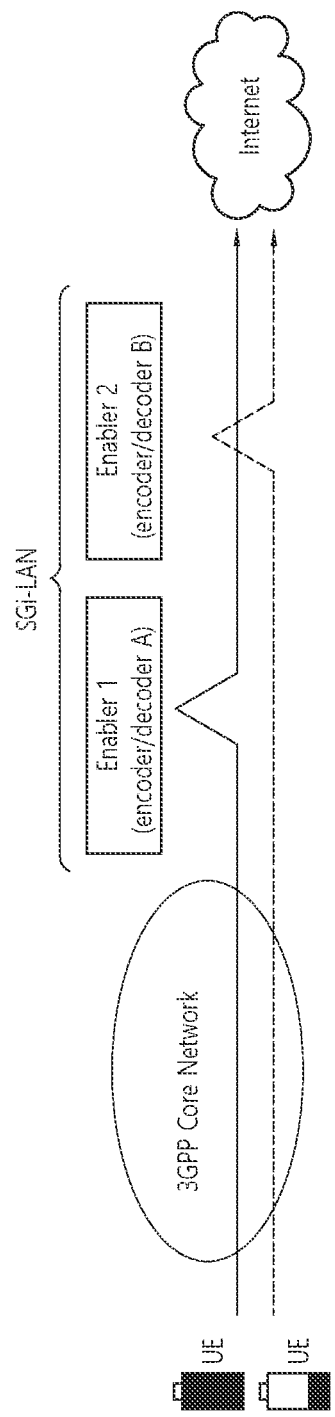
FIG. 9 shows an example of a scenario in which an SFC path is changed according to a battery level of a UE to which implementations of the present disclosure is applied.

FIG. 9 shows an example of a scenario in which an SFC path is changed according to a battery level of a UE to which implementations of the present disclosure is applied.

In FIG. 9, the case of changing the encoder/decoder used for the XR service according to the battery level of the UE is exemplified. Since the power consumption of the UE differs depending on the codec and/or encoder/decoder used, the purpose is to change the enabler on the SFC path according to the analytics of the NWDAF that analyzes the power consumption related information of the UE and the efficiency on the SFC path in real time.

Referring to FIG. 9, when the battery level is high, an SFC path associated with enabler 1 may be determined. On the other hand, when the battery level is low, the SFC path associated with enabler 2 may be selected.

Figure 10:
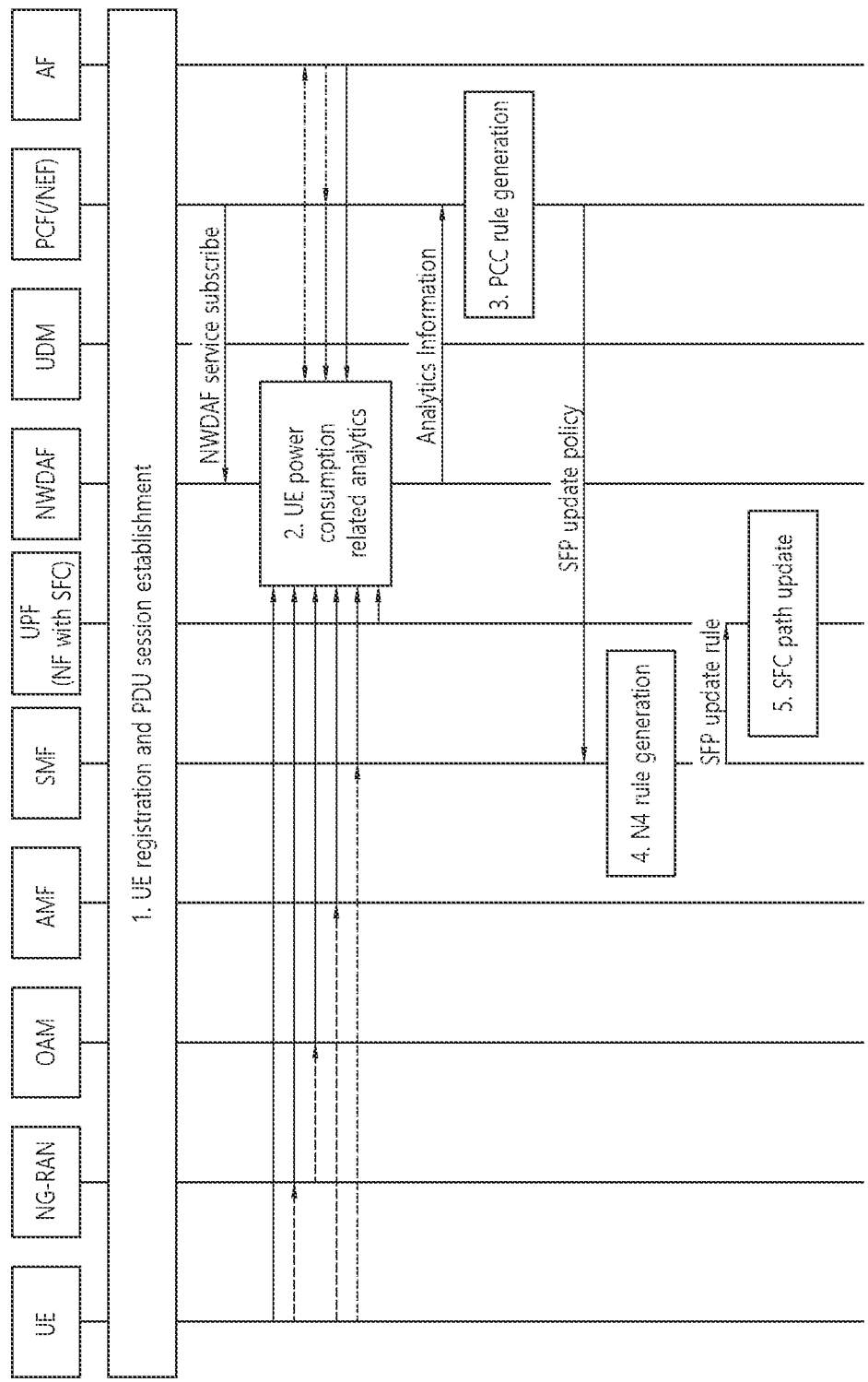
FIG. 10 shows an example of a procedure for changing an SFC path to which implementations of the present disclosure is applied.

FIG. 10 shows an example of a procedure for changing an SFC path to which implementations of the present disclosure is applied.

Referring to FIG. 10, the following operation may be performed.
1. The UE is registered with the 5G system and is provided with a service by establishing a PDU session for a specific service, e.g., an XR service.
2. The PCF subscribes to the service requesting analytics of the NWDAF. In particular, the PCF may subscribe to a service requesting analytics of the NWDAF in order to obtain statistic values and prediction values of information related to UE power consumption. In addition, the PCF may also obtain analytics conventionally provided by the NWDAF, such as statistical values and prediction values for service experience analytics.

In FIG. 10, a case in which the PCF subscribes to the NWDAF analytics service is described, but this is only an example. SMF, UPF or NFs having SFC function, other than PCFs, may subscribe to the analytics service of the NWDAF.
3. The PCF generates new PCC rules based on analytics information related to UE power consumption obtained from the NWDAF in addition to the conventional configurations. The new PCC rules are PCC rules that can affect the SFC path.
4. Upon receiving the PCC rule generated by the PCF, the SMF generates N4 rules to be transmitted to the UPF to affect the SFC path. The SMF may generate N4 rules based on the received PCC rules. Alternatively, the SMF may generate N4 rules based on analytics information related to UE power consumption directly obtained from the NWDAF.
5. The UPF or the NF having SFC function decides and/or applies a new SFC path according to the received rule and transmits data. Alternatively, the UPF or the NF having SFC function determines and/or applies a new SFC path based on analytics information related to UE power consumption directly obtained from the NWDAF and transmits data. An enabler applied may vary according to a new SFC path.

Drawings according to implementations of the present disclosure described above may be performed individually or may be performed together with other drawings.

The present disclosure may have various advantageous effects.

For example, data analytics can be utilized to target the 5G evolution and/or 6G of zero-touch configuration/operation environments with expanded network automation.

For example, an SFC path can be determined so that an encoder/decoder for XR service can be selected according to the battery level of the UE.

For example, Quality of Experience (QoE) for an end user service can be improved by dynamically changing an SFC path in real time.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:
1. A method comprising:
performing a registration procedure for a user equipment (UE);
performing a session establishment procedure for the UE;
receiving an N4 rule generated by a session management node from the session management node, wherein the N4 rule includes information related to a change of a service function chaining (SFC) path, wherein the information related to the change of the SFC path is generated by the session management node or by a policy control node, based on UE power consumption analytics, wherein the UE power consumption analytics are generated by a network data analytics node, based on information related to power consumption of the UE collected from the UE, wherein the UE power consumption analytics include at least one of a statistic value or a prediction value for efficiency of the SFC path that is changed depending on whether a specific enabler is used;

determining the SFC path based on the information related to the change of the SFC path; and communicating with the UE based on the determined SFC path.

2. The method of claim 1, wherein the method is performed by a network node supporting an SFC, and
wherein the network node supporting the SFC is a user plane node.

3. The method of claim 1, wherein the method is performed by a network node supporting an SFC, and
wherein the network node supporting the SFC is a network node different from a user plane node, and is located together with the user plane node or located separately from the user plane node.

4. The method of claim 1, wherein the information related to the power consumption of the UE includes information on a battery level of the UE.

5. The method of claim 1, wherein the policy control node generates a Policy and Charging Control (PCC) rule including the information related to the change of the SFC path.

6. The method of claim 1, wherein the information related to the change of the SFC path includes at least one of an index or an indicator associated with an SFC path change rule or a pre-configured SFC change rule.

7. The method of claim 1, wherein the SFC path is associated with at least one enabler.

8. The method of claim 1, wherein the UE communicates with at least one of a mobile device, a network and/or an autonomous vehicle other than the UE.

9. A network node comprising:
at least one transceiver;
at least one processor; and
at least one memory operably connectable to the at least one processor and storing instructions that, based on being executed by the at least one processor, perform operations comprising:

performing a registration procedure for a user equipment (UE);

performing a session establishment procedure for the UE;

receiving an N4 rule generated by a session management node from the session management node, wherein the N4 rule includes information related to a change of a service function chaining (SFC) path, wherein the information related to the change of the SFC path is generated by the session management node or by a policy control node, based on UE power consumption analytics, wherein the UE power consumption analytics are generated by a network data analytics node, based on information related to power consumption of the UE collected from the UE, wherein the UE power consumption analytics include at least one of a statistic value or a prediction value for efficiency of the SFC path that is changed depending on whether a specific enabler is used;

determining the SFC path based on the information related to the change of the SFC path; and communicating with the UE based on the determined SFC path.

10. The network node of claim 9, wherein the network node supports an SFC, and
wherein the network node supporting the SFC is a user plane node.

11. The network node of claim 9, wherein the network node supports an SFC, and
wherein the network node supporting the SFC is a network node different from a user plane node, and is located together with the user plane node or located separately from the user plane node.

12. The network node of claim 9, wherein the information related to the power consumption of the UE includes information on a battery level of the UE.

13. The network node of claim 9, wherein the information related to the change of the SFC path includes at least one of an index or an indicator associated with an SFC path change rule or a pre-configured SFC change rule.

14. The network node of claim 9, wherein the SFC path is associated with at least one enabler.

* * * * *